US010735281B1

(12) United States Patent
Burgin et al.

(10) Patent No.: US 10,735,281 B1
(45) Date of Patent: Aug. 4, 2020

(54) APPLICATION FOCUSED PROVISIONING SYSTEM

(71) Applicant: Amazon Technologies, Inc., Seattle, WA (US)

(72) Inventors: Joshua Marc Burgin, Seattle, WA (US); Anupama Sharma, Seattle, WA (US); Aleksei Besogonov, Seattle, WA (US); Boyd Lachlan McGeachie, Seattle, WA (US); Joby Sky Lafky, Seattle, WA (US); Andrei Prislopski, Issaquah, WA (US); Aniruddha Shriram Daptardar, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 205 days.

(21) Appl. No.: 15/379,431

(22) Filed: Dec. 14, 2016

(51) Int. Cl.
*H04L 12/24* (2006.01)
*H04L 29/08* (2006.01)

(52) U.S. Cl.
CPC ...... *H04L 41/5045* (2013.01); *H04L 41/5038* (2013.01); *H04L 67/02* (2013.01); *H04L 67/10* (2013.01)

(58) Field of Classification Search
CPC .................................................. H04L 41/5045
See application file for complete search history.

(56) References Cited

U.S. PATENT DOCUMENTS

| 8,805,971 | B1* | 8/2014 | Roth | G06F 9/5072 709/203 |
| 8,856,077 | B1* | 10/2014 | Roth | H04L 67/1095 707/638 |
| 2010/0153443 | A1* | 6/2010 | Gaffga | G06F 9/44505 707/770 |
| 2015/0312356 | A1* | 10/2015 | Roth | G06F 11/3006 709/226 |
| 2015/0363851 | A1* | 12/2015 | Stella | G06Q 30/0631 705/26.41 |

* cited by examiner

*Primary Examiner* — Esther B. Henderson
(74) *Attorney, Agent, or Firm* — Davis Wright Tremaine LLP

(57) ABSTRACT

A computing resource service provider may provide customer with access to computing resources which may be utilized by the customer to execute a variety of applications and/or tasks. A provisioning service of the computing resource service provider may obtain application information from the customer and determine a set of computing resource configurations suitable for executing the customer's application based at least in part on the application information obtained from the customer. The customer may select a particular computing resource configuration to execute the customer application.

20 Claims, 8 Drawing Sheets

APPLICATION FOCUSED PROVISIONING SYSTEM

BACKGROUND

The use of hosted computing services, storage, and computing resources has proliferated in recent years. The resources for network computing and storage are often provided by computing resource providers who leverage large-scale networks of computers, servers, and storage drives to enable clients, including content providers, customers, and the like, to host and execute a variety of applications and web services. The usage of network computing resources allows content providers and customers, among others, to efficiently and adaptively satisfy their computing needs. However, with the growing use of virtual resources, customers are encountering situations in which managing the virtual resources may be difficult to accomplish, such as configuring, provisioning, and determining computing resources to fit a particular customer application. In many cases, customers transmit requests to provision computing resources such as, for example, virtual machine instances to execute on hardware devices. These virtual machine instances can be automatically scaled or workloads may be balanced between virtual machine instances, enabling the computing resources service provider to accommodate customer needs during the situations requiring modifications to computing capacity. However, the variety of different architectures, the number of computing resources, and types of computing resources a customer may operate creates difficulty in managing these computing resources.

BRIEF DESCRIPTION OF THE DRAWINGS

Various techniques will be described with reference to the drawings, in which.

DETAILED DESCRIPTION

Figure 1:
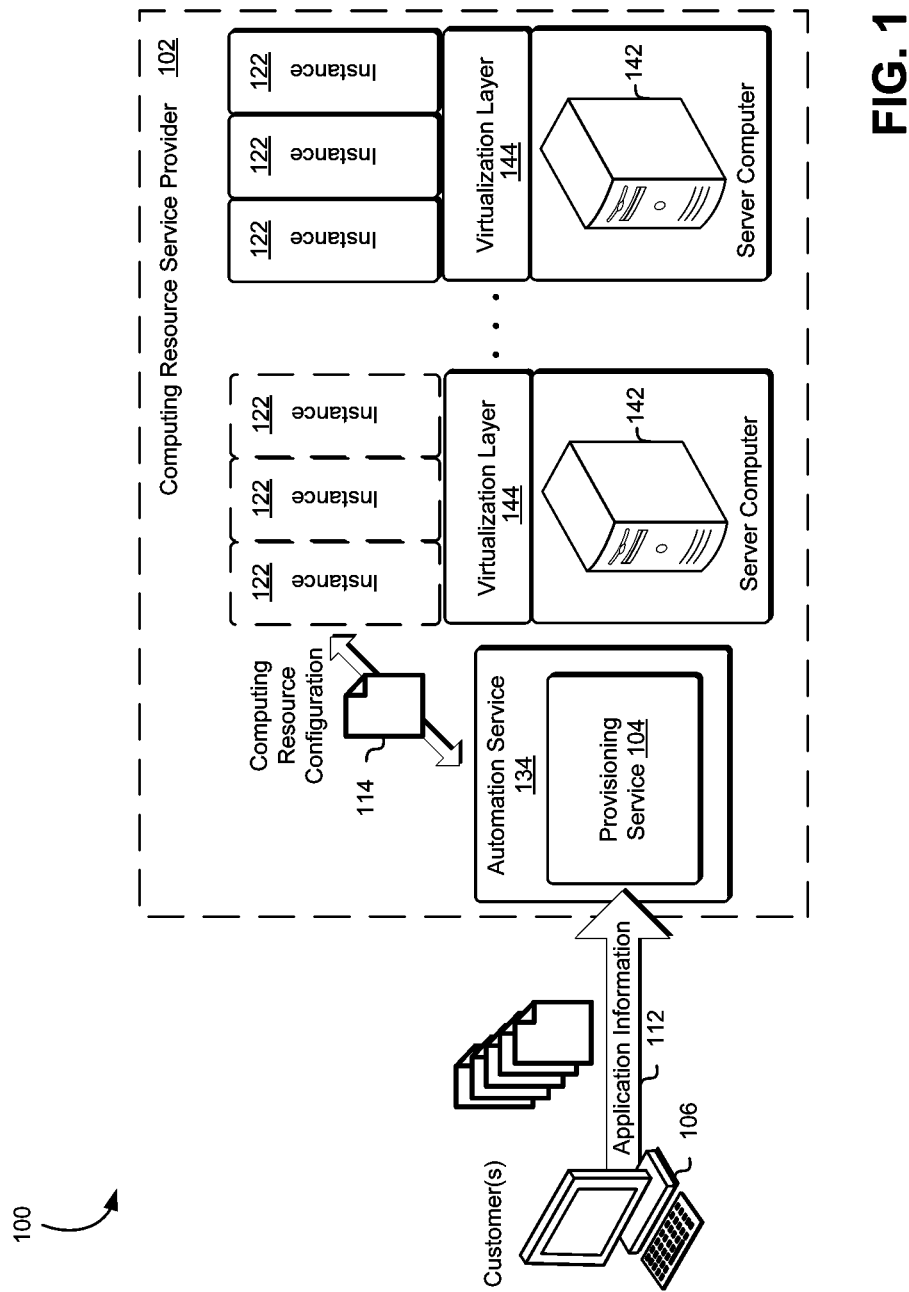
FIG. 1 illustrates an environment in which a provisioning service may automate certain aspects of provisioning computing resources to execute a customer application on behalf of a customer in accordance with an embodiment.

In various examples described below, a computing resource service provider provides customers with access to various computing resources to execute and/or operate various applications on behalf of the customer. For example, customers may be provided with access to a virtual computer system service; the virtual computer system service may provide customers with access to computing resources, such as virtual machines instances or similar host computer systems. In addition, the computing resource service provider provides other services, described in greater detail below that may provide additional types of computing resources and/or management options for various types of computing resources. For example, an automatic scaling service or load balancing service may provide a customer with methods for managing and scaling customer applications. It may be difficult for customers to determine particular configurations of computing resources that, when provisioned to execute the customer's application, provide the customer with the best, most cost-aware configuration of computing resources required to executed the customer's application. The systems and methods described in greater detail below provide customers capacity and cost-aware provisioning and fleet management, without exposing sensitive data and/or material to customers.

To make provisioning and management of computing resources used to execute customer application easier, a provisioning service obtains information associated with customer applications and identifies various computing resource configurations that may be used to execute the customer's application. Each computing resource configuration may include a variety of different computing resources, such as different types of virtual computing instances, that provides a solution to the customer's computing requirements. In addition, the computing resources may be localized to a particular zone (e.g., fault zone, availability zone, power zone, etc.) or distributed across a plurality of zones. The provisioning service may also determine an estimated cost for each computing resource configuration and provide the customer with the cost estimate. This enables the customer to balance various aspects of the computing resource configuration, such as performance and interruption probability, with the cost of executing the customer's application.

To utilize the provisioning service, customers may provide application information such as a type of application, amount of computing capacity, availability requirements, fault tolerance, network bandwidth requirements, storage requirements, or any other information suitable for determining the computing resource requirements for the customer's application. For example, the customer may request a set of computing resources form the provisioning service. The provisioning service then prompts the customer for information associated with the customer's application. In this example, the customer is executing a web site to provide content to customers distributed globally. The provisioning service, based at least in part on the type of application provided by the customer, may determine various computing resource configurations including available computing resources in data centers distributed globally.

The provisioning service may include a set of rules or heuristics that may be used to determine various aspects of the computing resource configurations. For example, the provisioning service may obtain information corresponding to the available computing resources and determine, based at least in part on the set of rules or heuristics, which computing resources of the available computing resources to include in the various computing resource configurations. Returning to the example above, the set of rules or heuristics may indicate that computing resources executing the customer's application should be distributed among a plurality of data centers to increase the availability of the customer's web site. As another example, if the information associated with the customer's application indicates that a large amount of data transfer is required to execute the customer's application, the set of rules or heuristics may indicate that the computing resources of the various computing resource configurations should be localized to a single data center or zone.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which customers 106 may provide application information 112 for use by a provisioning service 104 to provision and manage a set of computing resources in accordance with an embodiment. A computing resource service provider 102 may provide computing resources to customers 106. The customers 106 may utilize physical hosts, described in greater detail below, operated by the computing resource service provider 102, to perform a variety of functions and/or execute a variety of applications. For example, the customers 106 may execute a website, log server, a database, batch job, data processing service, or other computing operations using the computing resources of the computing resource service provider 102.

The provisioning service 104 may obtain information from the customer 106 associated with the application or other job to be executed by the customer 106. This information may be obtained through a management console exposed to the customer 106, as described in greater detail below. Furthermore, this information may be provided as application information 112 to the adviser service 104. The application information 112 may include a variety of different information such as application type, execution duration, compute requirements, memory requirements, storage requirements, network bandwidth, type of computing resources desired, total budget for execution, interruption tolerance, availability, execution speed, distribution of computing resources, optimization of computing resources, or any other information associated with the application or job to be executed by the customer 106 using resources provided by the computing resource service provider 102 or other entity.

The provisioning service 104, as described in greater detail below, may generate a set of computing resource configurations 114. The computing resource configurations 114 may include information indicating particular computing resources to provision and associate with the customer 106 such that the computing resources may execute the customer's 106 application. The provisioning service 104 may obtain information indicating the available computing resources to execute the customer's 106 application and may determine, based at least in part on the application information 112, the set of computing resource configurations 114.

For example, the application information 112 may indicate that the customer 106 is attempting to execute a batch job that requires three computing instances 122 to execute. Computing instances 122 may include a variety of computing resources such as compute instances, virtual machine instances, or combination of physical and virtual computing resources. The provisioning service 104 may generate the set of computing resource configurations 114 such that each member of the set contains three computing instances 122 from a set of available computing instances. These computing instances 122 may be distributed between data centers, server, geographic locations, fault zones, availability zones, power zones, or any other physical or logical delineation between computing instances 122. Furthermore, the set of computing resource configurations 114 may be optimized or constrained across one or more variables as described in greater detail below. For example, the computing instances 122 included in the set of computing resource configurations 114 may be limited by a cost associated with executing the batch job in the particular computing instance.

Returning to the example above, once the provisioning service 104 has generated the set of computing resource configurations 114, the provisioning service may present the customer 106 with the ability to select a particular computing resource configuration 114 of the set of computing resource configurations 114. Based at least in part on the customer 106 selection, the provisioning service 104 may then cause the automation service 134 to provision the computing instance 122 indicated in the particular computing resource configuration 114, indicated in FIG. 1 as computing instance 122 with dashed lines.

Furthermore, the computing resource service provider 102 may provide additional services to the customer 106. For example, the computing resource service provider 102 may provide the customer 106 with access to an automatic scaling service, load balancing service, database service, on-demand storage service, or other service. These additional services may provide computing resources that may be used during execution of the customer's 106 application and/or may modify the operation of the computing resources executing the customer's 106 application. For example, the on-demand storage service may provide computing instances 122 executing the customer's 106 application with access to storage resources. In another example, the load balancing service may provide the customer with a load balancer that distributes requests between the computing instances 122 executing the customer's 106 application.

As described above, these services may provide the customer 106 with access to various different types of computing resources or may modify and/or extend the operations of other computing resources provided by the computing resource service provider 102 or other entity. The automation service 134 may, among other things, automate the execution of various jobs (e.g., batch job or data processing job) on computing resources operated by another entity, such as computing resources of a data center of the customer 106. The automation service 134 may also provision computing resources for the customer 106 based at least in part on application computing resource configurations 114, as illustrated in FIG. 1.

In some embodiments, the customers 106 may include organizations that operate computing resources which may be accessible to other customers of the computing resource service provider 102 or other entities in general. The term "organization," unless otherwise clear from context, is intended to be read in the broad sense to imply a set of principals organized in some manner. For example, the customer may operate a website that is accessible to customers over a network, such as the Internet. The customers 106 may use computing resources of the computing resource service provider 102 to operate a load balancer and auto-scaling group configured to distribute requests to computing resources, such as instances 122, of the customer 106.

For example, auto-scaling groups, described in greater detail below, may comprise a set of instances 122 operated by the customer 106. The auto-scaling group may be configured to add or remove instances 122 and other computing resources to/from the auto-scaling group based at least in part on a setting provided by the customers 106 and/or computing resource service provider 102. A particular computing resource configuration 114 created by the provisioning service 104 may include computing resources of an automatic scaling service that performs auto scaling operations on a set of computing instances 122 included in the particular computing resource configuration 114. For example, the particular computing resource configuration 114 indicates whether to add computing resources (e.g., computing instances 122) to an auto-scaling group provisioned based at least in part on the particular computing resource configuration 114.

For example, the provisioning service 104 may determine particular operations required to provision computing resources included in the computing resource configurations 114. The particular operations may include, for example, associating a particular computing resource with a load balancer, adding a particular computing resource to an auto-scaling group, generating a snapshot of a computing resource, or any other operations required to provision computing resources included in the computing resource configurations 114.

Furthermore, the customer 106 may modify the computing resource configurations 114 prior to the automation service 134 or other service of the computing resource service provider provisioning computing resources to execute the customer's 106 application. As described in greater detail below in connection with FIGS. 2-4, the customer may be guided through the process of creating and/or modifying various aspects of the computing resource configurations 114.

As illustrated in FIG. 1, the computing resources of the customers 106 may include and/or be implemented by physical hosts operated by the computing resource service provider 102. However, in various embodiments, the computing resources utilized by the customers 106 include computing resources of the customer or other entities in accordance with the present disclosure. For example, the customer may operate a load balancer using computing resources of the computing resource servicer provider 102 to direct traffic to one or more servers operated by the customers 106. The computing resources may be a computer system or virtual computer system, supported by the physical hosts. For example, the load balancer may include physical hardware connected to a server rack or otherwise included in a data center. In another example, the load balancer may include one or more instances 122 supported by a particular physical host operated by the computing resource service provider 102 as described in greater detail below.

The customer 106 may interact with the computing resource service provider 102 and other service provided by the computing resource service provider 102, such as the provisioning service 104, via appropriately configured and authenticated application program interface (API) calls to provision, operate, and manage instances 122 instantiated on server computers 142 and operated by the computing resource service provider 102 used to execute the customer's 106 application. The customer 106 may be provided a customer interface, such as a management console described in greater detail below, to create, manage, modify, and operate the provisioning service 104, the computing resource configurations 114, instances 122, and other aspects of the computing resources executing the customer's 106 application. The management console may be exposed to the customers as a web page; by interacting with the web page (e.g., through a browser application), the customer may cause API calls to be generated. The generated API calls may cause the computing resource service provider 102 or component thereof, such as the provisioning service 104, to perform various operations indicated by the customer.

As illustrated in FIG. 1, the server computer 142 may be any device or equipment configured to execute instructions for performing data computation, manipulation, or storage tasks, such as a computer or a server. A server computer 142 may be equipped with any needed processing capability including one or more processors, such as a central processing unit (CPU), a graphics processing unit (GPU), or a digital signal processor (DSP), memory, including static and dynamic memory, and buses and input and output ports that are compliant with any handshaking, communications, or data transfer protocol. The physical hardware of the server computer 142 may also include storage devices, such as storage disks and tapes, networking equipment, and the like.

A virtualization layer 144 may include a bare metal hypervisor or a hosted hypervisor. The virtualization layer 144 executing on the server computer 142 enables the physical hardware to be used to provide computational resources upon which one or more instances 122 may operate. For example, the virtualization layer may enable a computing instance 122 to access physical hardware on the server computer 142 through virtual device drivers on the computing instance 122. The virtualization layer 144 may include a hypervisor or virtualization software and/or hardware. The virtualization layer 144 may also include an instance of an operating system dedicated to administering the computing instances 122 running on the server computer 142. Each virtualization layer 144 may include its own networking software stack responsible for communication with other virtualization layers 144 and, at least in some embodiments, may also be responsible for implementing network connectivity between the instances 122 running on the server computer 142 and other computing instances 122 running on other server computers 142.

Furthermore, the server computer 142 may host multiple virtualization layers 144 of the same or different types on the same server computer 142. The virtualization layer 144 may be any device, software, or firmware used for providing a virtual computing platform for the instances 122. The virtual computing platform may include various virtual computer components, such as one or more virtual CPUs, virtual memory, and the like. The computing instances 122 may be provided to the customers 106 of the computing resource service provider 102, and the customers 106 may run an operating system or an application on the computing instances 122 as described above. Further, the computing resource service provider 102 may use one or more of its own computing instances 122 for executing its applications including services as described herein. At least a portion of the computing instances 122 may execute kernel-level components for one or more other computing instances 122. For example, a particular computer instance 122 may execute a parent partition configured to manage one or more child partitions executed by other computing instances 122 where the particular computer instance 122 and the other computer instances 122 are supported by the same virtualization layer 144.

Commands and other information may be included in an API call from the provisioning service 104, automation service 134, or to the virtualization layer 144. As described above, the application information 112 may be provided to the provisioning service 104 via an API call. In addition, the provisioning service 104 may communicate with the virtualization layer 144 and/or other services of the computing resource service provider 102, such as the automation service 134 illustrated in FIG. 1, via API calls. For example, the provisioning service 104 may transmit an API call to the automation service 134 to provision one or more computing instances 122 included in a computing resource configuration 114. As a result, the automation service 134 may transmit an API call to a virtualization layer 144 supporting the one or more computing instances 122 to fulfil the API call transmitted by the provisioning service 104. Alternatively, the provisioning service 104 may transmit API calls directly to the computing resources.

Figure 2:
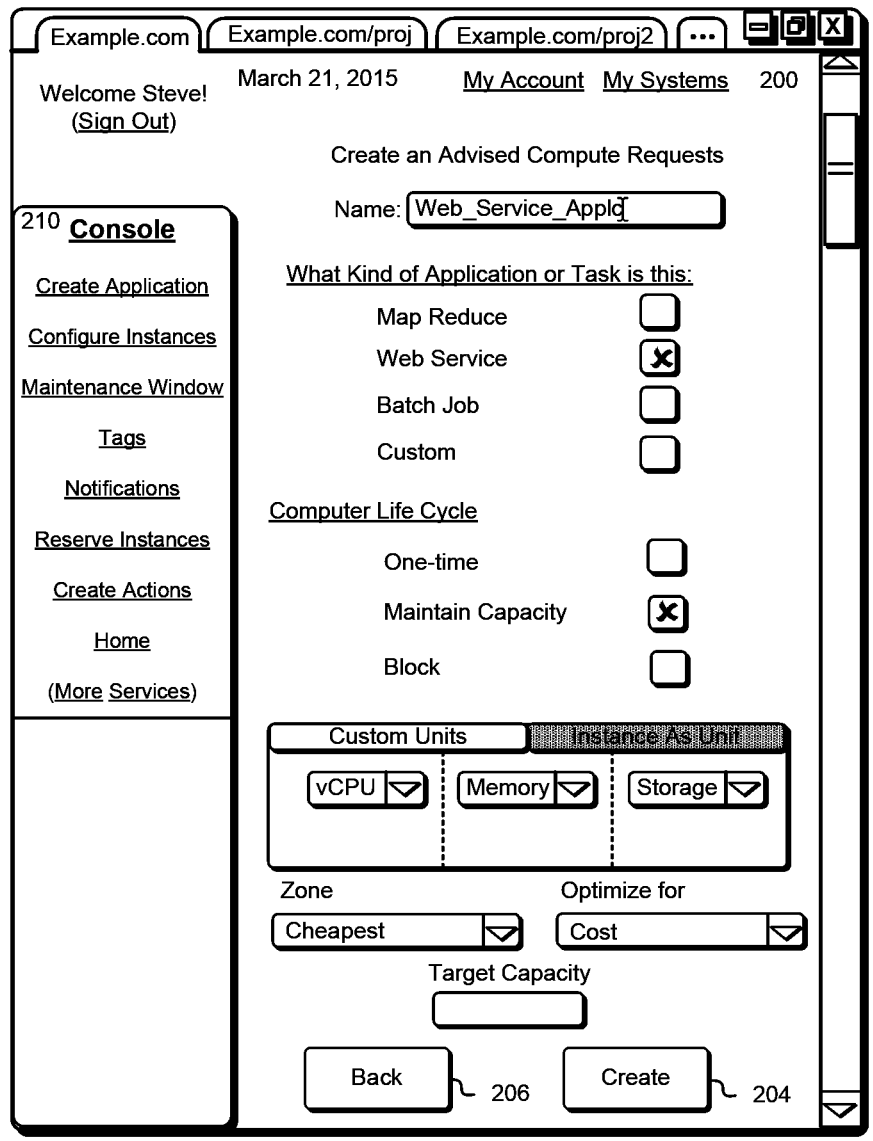
FIG. 2 illustrates a management console exposed as a web page enabling customers to provide customer application information to automate certain aspects of provisioning computing resources in accordance with at least one embodiment.

FIG. 2 shows a web page 200 which may be displayed by an application executed by a computing system enabling a customer to interact with an provisioning service operated by the computing resource service provider. As illustrated in FIG. 2, the web page 200 includes various graphical user interface elements that enable customers to provide information suitable for creating a computing resource configuration by the provisioning service of the computing resource service provider through a management console of which the web page 200 is a part. In various embodiments, the customer interacts with the provisioning service by issuing commands through the management console. The web page 200 may be displayed by various applications, such as a mobile application or web browser. In this example, the web page 200 includes various navigational features. For instance, on the left-hand side of the web page 200, various links 210 may link to one or more other web pages that contain additional content corresponding to a variety of different actions the customer may cause to be performed.

The web page 200 may correspond to operations that may be taken to create, modify, delete, manage, or otherwise control operation of the provisioning service before, during, and after provisioning of computing resources of various types managed by the provisioning service or other computing services of the computing resource service provider that execute applications on behalf of customers. In this example, the links appear as textual words which enable the links to be selected using an appropriate input device such as a keyboard, mouse, touchscreen, or other input device. Selection of one of the links 210 may cause an application displaying the web page 200 to submit, pursuant to a URL associated with the selected link by the programming of the web page 200, a request, such as an HTTP request, for the content associated with the link to a server that provided the web page 200 or another server.

In this example, the web page 200 also includes a graphical customer element configured as a "create" button 204. The create button 204 may be a graphical customer interface element of the web page 200 where the underlying code of the web page 200 is configured such that selection by an input device of the create button 204 causes application information corresponding to the selection of particular parameters and/or requirements of a customer's application selected on the web page 200 to be transmitted to the provisioning service. Furthermore, through the management console, the customer may be guided through the process of selecting various parameters, constraints, and/or requirements associated with creating computing resource configurations for various applications or other operations to be performed by computing resources on behalf of the customer.

The process may be divided into steps and the customer may be prompted to provide information at each step. For example, a customer, through the management console, may be presented with a list of applications or tasks under which the customer's application may be categorized. The customer may select a type or category of application, illustrated in FIG. 2 as a list with corresponding check boxes, and the management console may then display potential parameters, constraints, and/or requirements such as the computing units, zone selections, optimization parameters, and target capacity. For example, as illustrated in FIG. 2, the customer may indicate the application is a web service application for which the customer wishes to maintain capacity.

Through the management console the provisioning service may select and display various parameters of the computing resource configurations that may be suitable for executing a web service which maintains capacity. For example, the provisioning service may suggest an amount of computing capacity or a particular distribution of the computing resources executing the customer's web service. These parameters may be presented to the customer through the management console, and the customer may accept the parameters or may modify the parameters. In another example, the customer may, through the management console, provide a default or single set of parameters, constraints, and/or requirements for generating computing resource configurations.

As described in greater detail below, the provisioning service may include a set of heuristics and/or rules that define the parameter, constraints, and requirements that are provided to the customer. For example, if the customer selects a batch job from the list of applications that customer would like to execute, the provisioning service may cause the "one time" computer life cycle to be selected, the "zone" to be set to cheapest, and the optimization parameter to be set to "cost" in the customer interface of the management console based at least in part on the set of heuristics. The set of heuristics may include various rules that when applied to various selections of user interface elements representing options or other information selected by a customer, cause various other user interface elements, options, or other information to be selected. As illustrated in FIG. 2, once the user selects web service under the application type or category option list, the selection may be evaluated based at least in part on the set of heuristics and additional parameters and/or options may be selected such as the "maintain capacity" parameter. At this point, if the customer selected the create button 204, the provisioning service may determine a set of computing resource configurations matching the parameters selected in the management console. Similarly, if the customer modifies one or more of the parameters the provisioning service will determine the set of computing resource configurations matching the parameters modified by the customer.

The customer, using an input device, may select a set of parameters, constraints, and/or requirements used by the provisioning service to generate one or more computing resource configurations. For example, the customer may indicate a particular number of virtual processors, memory, and/or storage of various computing resources. In another example, as described in greater detail below, the customer may select particular types of computing resources to execute the customer application.

As illustrated in FIG. 2, the web page 200 may contain a graphical customer interface element configured as a check box or radio button configured to enable the customer to select various options displayed by the web page 200. Selection of the check box or radio button may cause the underlying code of the web page 200 to cause information corresponding to the selection of the check box or radio button to be transmitted to the provisioning service; for example, as described above, when the customer selects the check box corresponding to the web service application. The web page 200 may contain a graphical customer interface element configured as an input box. The input box may enable the customer, through an input device such as a keyboard or virtual keyboard, to provide information, such as a customer assigned named for the customer application as illustrated in FIG. 2. The management console of which web page 200 is a part may also be configured such that the management console is connected to or responsible for orchestration and execution of the customer applications as described above in connection with FIG. 1. For example, the management console may provide an interface for managing the execution of various customer applications on computing resources and determining which computing resources to execute based at least in part on the application information.

The web page 200 may also include a graphical customer element configured as a "back" button 206. The back button 206 may be a graphical customer interface element of the web page 200 where the underlying code of the web page 200 causes the application displaying the web page 200 to transmit a command to the computing systems to return to a previously navigated web page of the management console. In this example, the web page 200 contains a prompt asking the customer to provide information which may be utilized by the provisioning service to generate one or more computing resource configurations. The selection of application information provided to the customer using the web page 200 may be included in the web page 200 based at least in part on customer preference, popularity among customers, features of the computing resources, features of the applications or tasks selected by the customer, an administrator associated with the customer, or other information suitable for providing requirements associated with a particular application. For example, a database application check box may be added to the web page 200 in response to customer preference of capabilities of computing resources provided by the computing resource service provider.

Once the customer has made a selection using the web page 200 and selected the create button 204, the application displaying the web page 200 may submit a request, such as an HTTP request, to the provisioning service to generate one or more computing resource configurations based at least in part on the information provided in the web page 200. The request may be transmitted to one or more server computers of the provisioning service operated by the computing resource service provider. Furthermore, the provisioning service may obtain additional information from one or more other services in order to complete the request from the customer. For example, the provisioning service may obtain capacity information from a data storage service, instances information from an instance service, auto-scaling information from an automatic scaling service, load balancing information from a load balancing service, database information from a database service, price information from various services, or other information from various services of the computing resource service provider as described herein.

The provisioning service may then process that information obtained from the web page 200 and generate one or more computing resource configurations that may be used to execute the customer's application based at least in part on the information obtained from the web page 200. In various embodiments, the provisioning service or other service the computing resource service provider returns, in response to the request, such as an HTTP request from the customer, identification information configured to identify the one or more computing resource configurations generated by the provisioning service based at least in part on the information provided by the customer through the web page 200. As discussed herein, in other examples, the provisioning service may transparently implement a computing resource configuration without alerting the customer.

Figure 3:
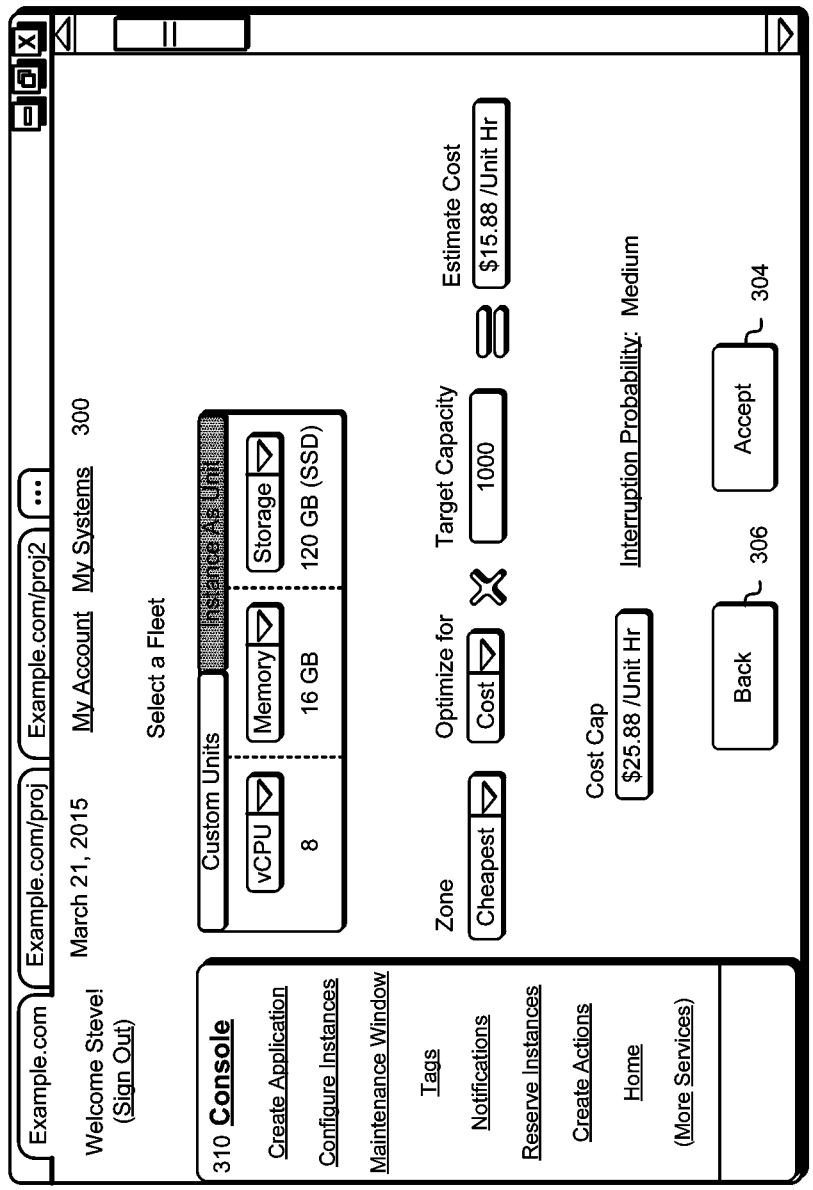
FIG. 3 illustrates a management console exposed as a web page enabling customers to provide customer application information to automate certain aspects of provisioning computing resources in accordance with at least one embodiment.

FIG. 3 shows a web page 300 which may be displayed by an application executed by a computing system enabling a customer to interact with a provisioning service operated by the computing resource service provider. As illustrated in FIG. 3, the web page 300 includes various graphical user interface elements that enable customers to provide application information used by the provisioning service to generate a set of computing resource configurations that may be selected by customers to execute customer applications through a management console of which the web page 300 is a part. In various embodiments, the customer interacts with the provisioning service by issuing commands through the management console. The web page 300 may be displayed by various applications, such as a mobile application or web browser. In this example, the web page 300 includes various navigational features. For instance, on the left-hand side of the web page 300, various links 310 may link to one or more other web pages that contain additional content corresponding to a variety of different actions the customer may cause to be performed.

The web page 300 may correspond to operations that may be taken to manage or otherwise control customer applications executed by computing resources managed by services of the computing resource service provider. In this example, the links appear as textual words which enable the links to be selected using an appropriate input device such as a keyboard, mouse, touchscreen or other input device. Selection of one of the links 310 may cause an application displaying the web page 300 to submit, pursuant to a URL associated with the selected link by the programming of the web page 300, a request, such as an HTTP request, for the content associated with the link to a server that provided the web page 300 or another server.

In this example, the web page 300 also includes a graphical customer element configured as an "accept" button 304. The accept button 304 may be a graphical customer interface element of the web page 300 where the underlying code of the web page 300 is configured such that selection by an input device of the accept button 304 causes information corresponding to the selection of various parameters (e.g., estimated cost) selected on the web page 300 to be transmitted to the provisioning service. Furthermore, through the management console, the customer may be guided through the process of selecting various constraints, settings, and/or requirements associated with provisioning a computing resource configuration to execute the customer's application. The process may be divided into steps and the customer may be prompted to provide information at each step. For example, the web page 300 displays to the customer parameters for the computing resources included in the computing resource configurations generated by the provisioning service including cost information. For example, as illustrated in FIG. 3, the customer may select parameters affecting the cost of operating the computing resources and a desired capacity; in turn the provisioning service may display an estimated cost of executing the customer's application to the customer through the web page 300.

The customer, using an input device, may select various aspects of the computing resources, the zone(s), and/or location(s) of the computing resources of the computing resource configuration, and an optimization parameter or dimension. Additionally, the customer may indicate a cost cap or maximum amount the customer is willing to pay for execution of the customer's application. For example, as illustrated by FIG. 3, the customer may select from a drop down menu various zone types such as single zone, diversified zones, lowest cost zone, or any other physical or logical grouping of the computing resources of the computing resource configurations. In another example, as illustrated by FIG. 3, the customer may select from a drop down menu an optimization parameter which may cause the provisioning service to select instances matching the optimization parameter such as for the lowest cost, the highest availability, greatest network bandwidth, greatest storage capacity, or any other parameter or dimension that may be optimized. In addition, the customer may specify a total number of compute units or total capacity desired for executing the customer's application.

The customer selection may be stored until the entire process is completed, or the customer selection may be transmitted to the instance service upon selection of a graphical customer interface element. For example, once the customer provides a cost cap, the web page 300 may provide that information to the provisioning service, and the provisioning service may return an interruption probability which may be displayed on the user interface of web page 300 to the customer. The interruption probability may indicate a likelihood that the customer's application may be terminated or interrupted as a result of the cost of execution exceeding the cost cap specified by the customer. For example, if a customer application executed is executed in a single zone and the computing resources within the zone exceed the cost cap provided by the customer, the customer's application may be terminated or otherwise interrupted to avoid exceeding the cost cap. Computing resources within a zone may increase in cost based at least in part on an amount of remaining available capacity within the zone. As illustrated in FIG. 3, the web page 300 may contain a graphical customer interface element configured as an input box configured to enable the customer to enter a desired value for target capacity and cost cap. The management console may provide an interface for managing the customer applications and automated provisioning of computing resources.

The web page 300 may also include a graphical customer element configured as a "back" button 306. The back button 306 may be a graphical customer interface element of the web page 300 where the underlying code of the web page 300 causes the application displaying the web page 300 to transmit a command to the computing system to return to a previously navigated web page of the management console. In this example, the web page 300 contains a prompt asking the customer to provide information which may be used by the provisioning service to create and/or maintain computing resources of a particular computing resource configuration executing customer applications. The application information obtained by the provisioning service may be used by an automation service, described in the present disclosure, to provision computing resources suitable for executing the customer's application. For example, the provisioning service may simplify the process of determining computing resources suitable for executing the customer's application by prompting the customer to provide application information that may be used by the provisioning service to determine computing resource configurations suitable for executing the customer's application.

Once the customer has made a selection using the web page 300 and selected the accept button 304, the application displaying the web page 300 may submit a request, such as an HTTP request, to the provisioning service to generate the computing resource configurations based at least in part on the information provided in the web page 300. The request may be transmitted to one or more servers of the provisioning service operated by the computing resource service provider. Furthermore, the provisioning service may obtain additional information from one or more other services in order to complete the request from the customer.

Figure 4:
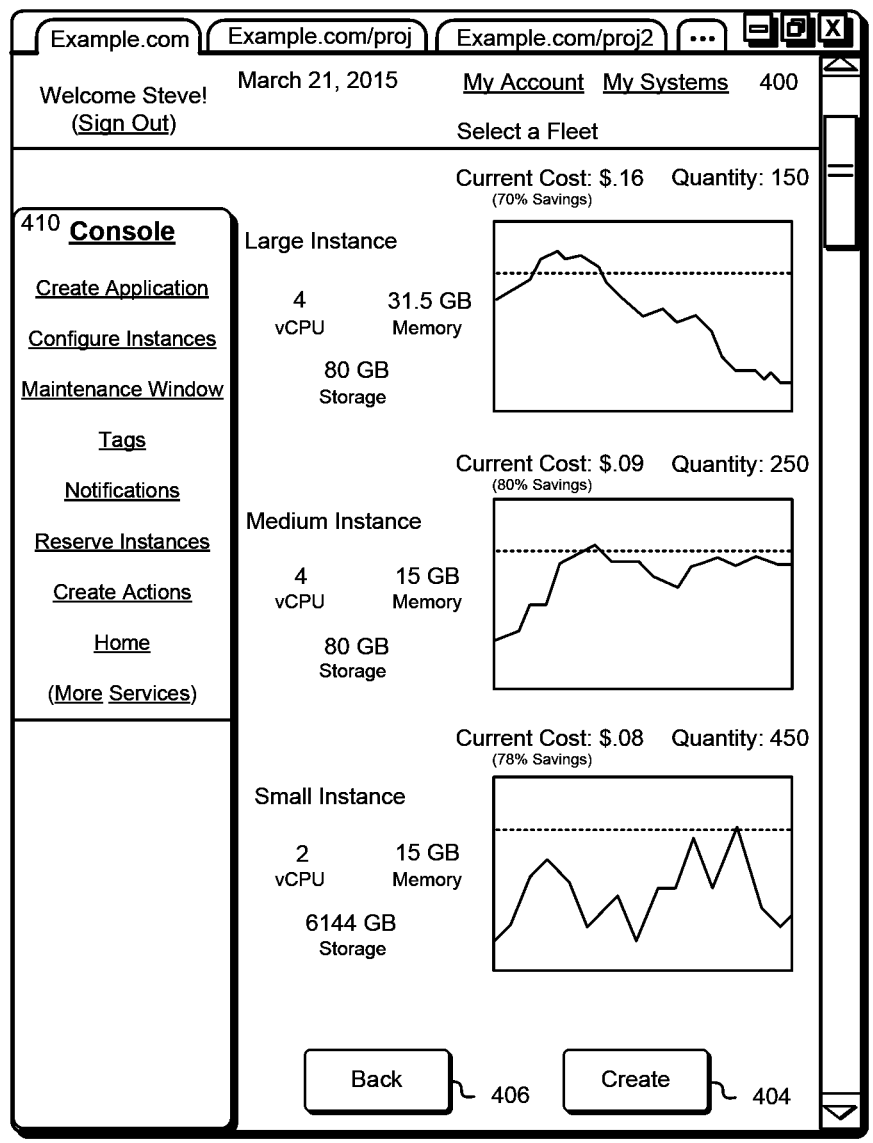
FIG. 4 illustrates a management console exposed as a web page enabling customers to provide customer application information to automate certain aspects of provisioning computing resources in accordance with at least one embodiment.

FIG. 4 shows a web page 400 which may be displayed by an application executed by a computing system enabling a customer to interact with a provisioning service operated by the computing resource service provider. As illustrated in FIG. 4, the web page 400 includes various graphical user interface elements that enable customers to select various types of computing resources that may be used by the provisioning service or other service of the computing resource service provider to provision particular computing resources to execute the customer's application through a management console of which the web page 400 is a part. In various embodiments, the customer interacts with the provisioning service by issuing commands through the management console. The web page 400 may be displayed by various applications, such as a mobile application or web browser. In this example, the web page 400 includes various navigational features. For instance, on the left-hand side of the web page 400, various links 410 may link to one or more other web pages that contain additional content corresponding to a variety of different actions the customer may cause to be performed.

The web page 400 may correspond to operations that may be taken to manage or otherwise control customer application executed by computing resources managed by services of the computing resource service provider. In this example, the links appear as textual words which enable the links to be selected using an appropriate input device such as a keyboard, mouse, touchscreen or other input device. Selection of one of the links 410 may cause an application displaying the web page 400 to submit, pursuant to a URL associated with the selected link by the programming of the web page 400, a request, such as an HTTP request, for the content associated with the link to a server that provided the web page 400 or another server.

In this example, the web page 400 also includes a graphical customer element configured as a "create" button 404. The create button 404 may be a graphical customer interface element of the web page 400 where the underlying code of the web page 400 is configured such that selection by an input device of the create button 404 causes information corresponding to the selection of various computing resource types selected on the web page 400 to be transmitted to the provisioning service. Furthermore, through the management console, the customer may be guided through the process of selecting various computing resource types associated with the computing resource configuration generated by the provisioning service.

The process may be divided into steps and the customer may be prompted to provide information at each step. For example, the web page 400 displays various types of computing resources that may be selected by the customer to execute the customer's application. In addition, as illustrated in FIG. 3, the web page 300 may display pricing curves and/or graphs of various computing resource types over an interval of time. Furthermore, the pricing curves and/or graphs may indicate the customer's cost cap illustrated in FIG. 3 as a dash line within the pricing curves and/or graphs. The pricing curves and/or graphs may be determined based at least in part on a history of the particular computing resource type, for example, the customer demand for the computing resource type over an interval of time.

The customer, using an input device, may select one or more computing resource types to execute the customer's application. Additionally, physical and/or virtual resources of the computing resources may be displayed in the web page 400. For example, for the various computing resource types, the web page 400 may display the number of processors or the amount of memory or storage available to the particular computing resource type.

The customer selection may be stored until the entire process is completed, or the customer selection may be transmitted to the instance service upon selection of a graphical customer interface element. The web page 400 may also include a graphical customer element configured as a "back" button 406. The back button 406 may be a graphical customer interface element of the web page 400 where the underlying code of the web page 400 causes the application displaying the web page 400 to transmit a command to the computing system to return to a previously navigated web page of the management console. In this example, the web page 400 contains a prompt asking the customer to provide information which may be used by the provisioning service to create and/or maintain computing resources of the particular computing resource type selected by the customer. The information selected in the web page 400 may be obtained by the provisioning service and may be used by an automation service, described in the present disclosure, to provision the particular computing resources type to execute the customer's application.

Once the customer has made a selection using the web page 400 and selected the accept button 404, the application displaying the web page 400 may submit a request, such as an HTTP request, to the provisioning service to provision computing resources based at least in part on the information provided in the web page 400. The request may be transmitted to one or more servers of the provisioning service operated by the computing resource service provider. Furthermore, the provisioning service may obtain additional information from one or more other services in order to complete the request from the customer.

The environment such as that illustrated in FIG. 1 may be useful for a provider such as a computing resource provider, wherein a computing resource responds to requests from customers to automate at least a portion of the process required to provision computing resources to execute a customer application. As discussed above, the computing resource service provider provides a mechanism to allow customers to provide application information and select computing resource configurations that when provisioned may executed the customer's application. The environment in such a case may include additional components and/or other arrangements, such as those illustrated in the networked environment 500 of FIG. 5. In this example, the networked environment 500 includes a computing resource service provider in data communication with a client device 506 and server computers 542 over a network 508.

In one embodiment, the server computers 542 may be one or more computer hardware devices that are used to implement instances 522. For example, the server computers 542 may include hardware for implementing types of computing resources, such as storage devices, virtualized storage devices, networking devices, and the like as described herein. Additionally, the implemented computing resources may be programmatically and remotely managed by a customer of the computing resource service provider.

The server computers 542 include a plurality of computer system devices that are each capable of executing one or more instances 522 created by the computing resource service provider. In one embodiment, each of the server computers 542 includes a processor, a data store, an input/output bus, and/or any other component known in the art for executing instances 522. Additionally, the instances 522 may be virtual machine instances. As known in the art, a virtual machine instance is an instance of a software implementation on a machine (e.g., a computer) that executes programs like a physical machine. For example, each of the server computers 542 may be configured to execute an instance manager 518 capable of implementing the instances 522. For example, the instance manager 518 may be a hypervisor, virtualization layer, or any other type of program configured to enable the execution of multiple instances 522 on a single server computer 542. As discussed above, each of the instances 522 may be configured to execute all or a portion of an application. Additionally, the network 508 may be a private or public network such as the Internet. The networked environment 500 may span one or more data centers, where each data center may be geographically distinct from each other. Additionally, the networked environment 500 shown in FIG. 5 may be one of several embodiments employed by the computing resource service provider.

In one embodiment, the computing resource service provider includes a provisioning service 504 which in turn includes or communicates with various services and/or micro-services such as an provisioning data store 510, an orchestration service 512, an automatic scaling service 526, an automation service 534, a maintenance window service 532, a load balancing service 536, a notification service 530, and/or other components. The other components may include other services of the computing resource service provider which the provisioning service 504 has access to, such as metrics service, instance service, or other services. The provisioning data store 510 may include one or more heuristics 546, historical information, pricing information, capacity information, availability information, or other information suitable for generating and provisioning computing resource configurations. For example, as described above, the provisioning data store 510 includes one or more heuristics 546 which may be used to determine various aspects of computing resource configurations based at least in part on application information provided by the customer. For example, the customer may specify a number of processors, amount of memory, or other information about the customer's application, and the one or more heuristics 546 may indicate a type of computing instance (e.g., a medium compute instance) matching the information provided by the customer. In another example, the one or more heuristics 546 may take as an input a type or category of application to be executed by the customer and may return a set of recommended parameters such as zone parameters, cost parameters, compute capacity, memory capacity, storage capacity, network bandwidth, or other parameters of a set of computing instances that may be used to execute the customer's application. The one or more heuristics 546 include rules for selecting additional parameters for the customer's application based at least in part on the information provided by the customer. These additional parameters may be displayed to the customer prior to generating the computing resource configurations so that the customer may modify at least a portion of the parameters selected based at least in part on the one or more heuristics 546.

Unless otherwise stated or clear from context, the term "service" or "micro-service" may be understood to be a computer system program, process, client, server, service, application, module, operating system entity, controlling domain, communication node, or collection of these and/or other such computer system entities. A "service" may be a client and/or a server and in some embodiments may be configured to send and/or receive communications, data, requests, and/or other such requests from other services within the computer system.

The orchestration service 512 provides a mechanism for customers to provide information to automate provisioning operations on computing resources executing the customer's application. In addition, the orchestration service 512 may provide default provisioning operations that the customer may use for various applications. For example, the orchestration service 512 may provide default provisioning workflows to automate provisioning operations for various type of computing resources. In various embodiments, the orchestration service 512 provides public APIs or other mechanisms to receive requests 538 from the client device 506 to perform various functions of the provisioning service 504.

Figure 5:
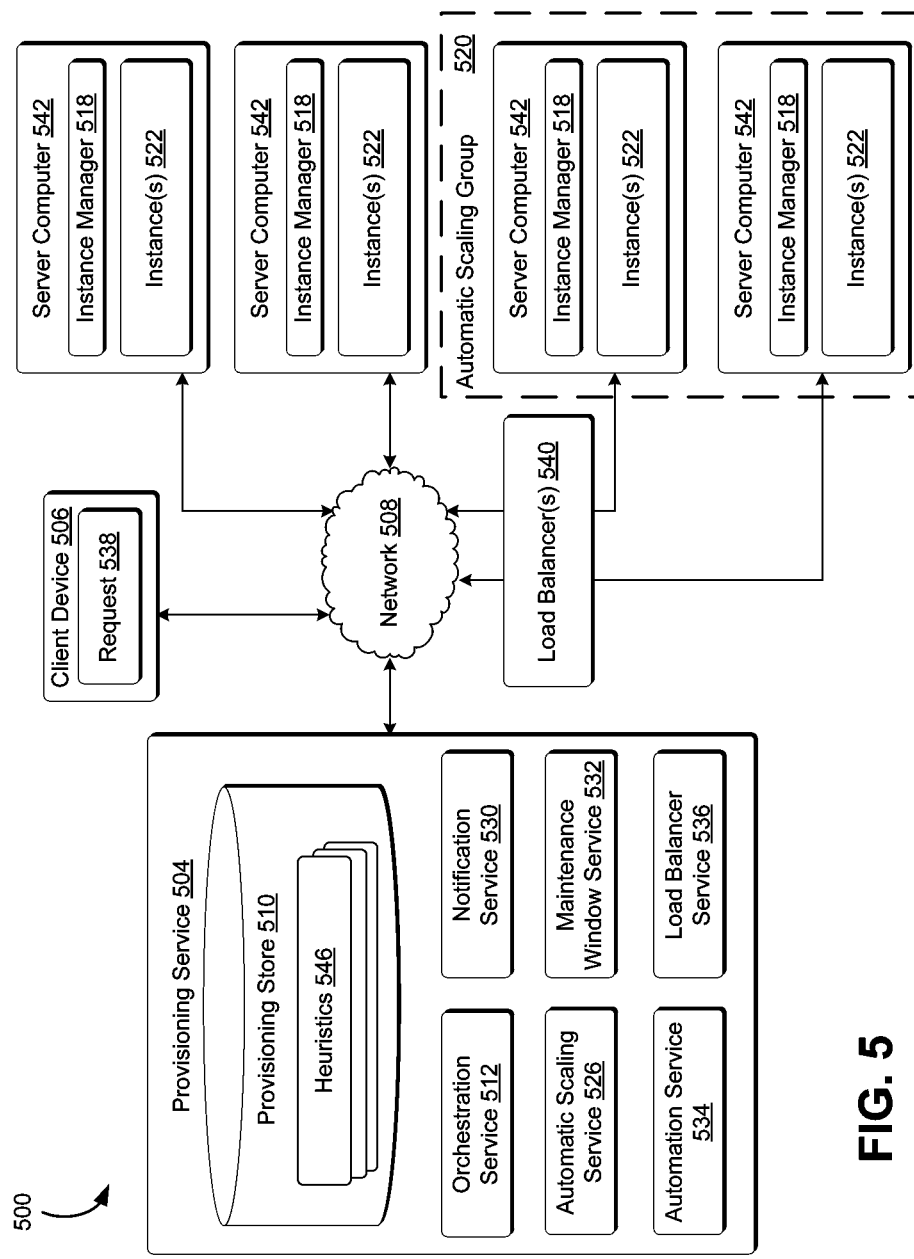
FIG. 5 illustrates an environment in which a provisioning service may automate certain aspects of provisioning computing resources to execute a customer application on behalf of a customer in accordance with an embodiment.

The automatic scaling service 526 may automate scaling operations for the customer. For example, the automatic scaling service 526 may maintain an amount of computing capacity or number of computing resources in an automatic scaling group 520. The computing resource in the automatic scaling group 520 may execute the customer's application and may be behind one or more load balancers as illustrated in FIG. 5. The customer may also submit requests 538 including application information or other requests 538 to the provisioning service. For example, the customer can query the automatic scaling service 526 for information associated with a set of computing resources currently executing the customer's application. The automatic scaling service 526 may periodically or a periodically modify the membership of the automatic scaling group based at least in part on the application information. For example, if the computing resources included in the automatic scaling group have become more expensive or of a different type than selected by the customer, the automatic scaling service 526 may replace computing resources in the automatic scaling group with computing resources matching the parameters selected by the customer. As described above, the customer may submit a request 538, such as an API call or other command, to perform such operations.

The automation service 534 obtains computing resource configuration information and generates computing resources according to the computing resource configuration information. In addition the automation service 534 may enable customers to manage, execute, and access the execution of the computing resources.

The maintenance window service 532 provides customers with the ability to define one or more recurring windows of time during which the provisioning service 504 may determine if the computing resources executing the customer's application should be modified based at least in part on the application information provided by the customer. For example, if the cost of executing the customer's application begins to exceed the cost cap provided by the customer, the maintenance window service 532 may determine that the computing resources should be moved to cheaper computing resources. The customer can create, delete, or modify maintenance windows by submitting requests 538 from the client device 506, for example, by submitting API calls.

The notification service 530 may provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 530 may provide notifications to clients using a "push" mechanism without the need to check periodically or "poll" for new information and updates. The notification service 530 may further be used for various purposes such as monitoring applications executing in the instances, execution of patch workflows, time-sensitive information updates, and many others.

The instance service instantiates instances 522 based at least in part on a set of preferences provided by the provisioning service 504 or other component such as the automation service 534. In one embodiment, the instance service receives, from the provisioning service 504 or other component such as the automation service 534, a request to create one or more instances 522 and optionally assign the created instances 522 to an automatic scaling group 520 and/or load balancer 540. Additionally, the request received from the provisioning service 504 or other component such as the automation service 534 may also indicate a time to start execution of the requested instances 522. In response to receiving the request, the instance service instantiates instances 522. In various embodiments, the automatic scaling service 526 receives the request and transmits a command to the instance service to instantiate the instances 522 such that the instances are associated with the automatic scaling group 520, for example, by associating automatic scaling group 520 metadata with the instances 522.

As described above, the management console may be exposed to the customers as a web page; by interacting with the web page (e.g., through a browser application) the customer may cause API calls to be generated. The generated API calls may cause the computing resource service provider or component thereof, such as the provisioning service 504, to perform various operations indicated by the customer. The customer may interact with the computing resource service provider (via appropriately configured and authenticated API calls) to provision, operate, and manage instances 522 on server computers 542 operated by the computing resource service provider. Additionally, the customer may create one or more automatic scaling groups 520, and the automatic scaling groups 520 may be a logical collection of instances 522. The instances 522 and automatic scaling groups 540 created by the customer may be included in application information provided to the provisioning service. In this manner, the provisioning service 504 may include pre-existing customer operated computing resources in the computing resource configuration information.

Furthermore, the instances 522 may be assigned to the automatic scaling group 520 or may be members of the automatic scaling group 520. The automatic scaling service 526 may allow the provisioning service 504 or other component such as the automation service 534 to interact with and manage various automatic scaling groups. For example, the provisioning service 504 or other component such as the automation service 534 may, through the automatic scaling service 526, set a maximum or minimum capacity for an automatic scaling group 520. In addition, the provisioning service 504 or other component such as the automation service 534 may also define preferences for the behavior of the automatic scaling group 520 during executing of the customer's application.

The provisioning service 504 or other component such as the automation service 534 may also assign one or more load balancers 540 to the automatic scaling group 520 or particular sets of instances 522. The instances 522 of the automatic scaling group 520 or those assigned to a load balancer 540 may be used for various purposes, such as to operate as servers supporting a website, to operate business applications or, generally, to serve as computing power for the customer. Other applications for the instances 522 may be to support database applications, electronic commerce applications, business applications and/or other applications. Additionally, load balancers 540 may distribute traffic to various instances 522 of the automatic scaling group 520 to enable operation of the instances 522 for the various purposes described above and prevent the instances 522 of the automatic scaling group 520 from being overloaded. Although the instances 522 as shown in FIG. 5 are virtualized, any other computer system or computer system service may be utilized by the computing resource service provider, such as a computer system or computer system service that does not employ virtualization or instantiation and instead provisions computing resources on dedicated or shared computers/servers and/or other physical devices.

A load balancer service 536 may be offered to customers of a computing resource service provider in order to facilitate request processing by instances 522 of the customer. In various embodiments, the instances 522 may be assigned to the automatic scaling group 520, and the load balancer service 536 may distribute traffic to the instances 522 assigned to the automatic scaling group 520. For example, the customer may operate a website using instances 522 assigned to the automatic scaling group 520 using the resources of the computing resource service provider. Additionally, the website may receive requests from multiple other customers over the network 508. The load balancer 540 may direct the requests to the instances 522 of the automatic scaling group 520 executing the website in such a way that the load generated by processing the requests is distributed among the instances 522 of the automatic scaling group 520 executing the website.

Figure 6:
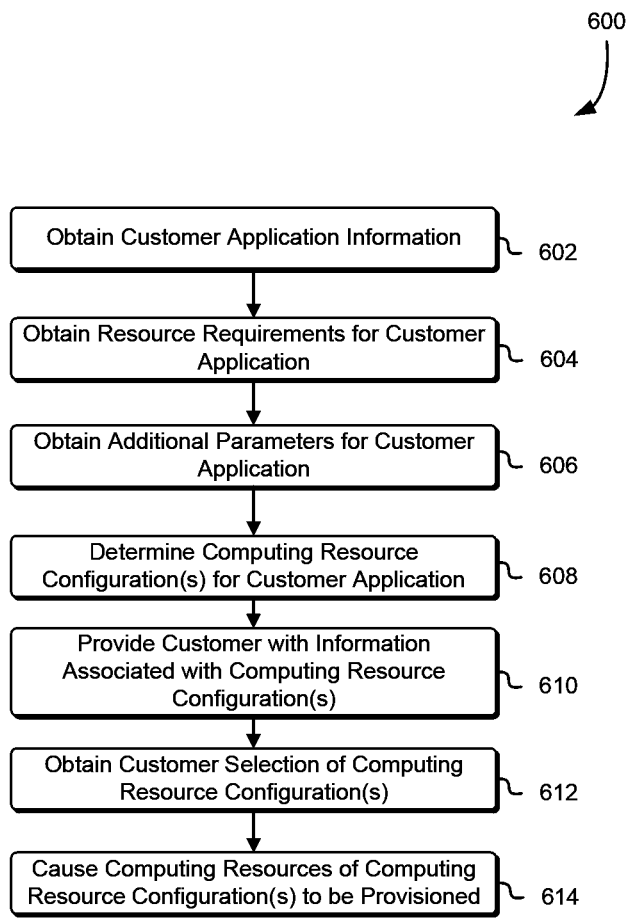
FIG. 6 is a block diagram that illustrates an example of provisioning computing resources on behalf of a customer to execute a customer application in accordance with an embodiment.

FIG. 6 is a block diagram illustrating an example of a process 600 for managing and provisioning computing resources to execute a customer's application in accordance with an embodiment. The process 600 may be performed by any suitable system such as a provisioning service described above in connection with FIGS. 1 and 5. Some or all of the process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

The process 600 includes obtaining customer application information 602. The customer application information may include a type or category of the customer's application or task as described above in connection with FIG. 2. For example, the customer may indicate that the customer application is a batch job, a web service, web site, data processing job, map reduce job, or any other task the customer may wish to execute using computing resources. As described above, the selection of a particular type or category of the customer's application or task may initiate a process which may guide the customer through a process of generating one or more computing resource configurations which may be used to execute the customer's application. The customer application information may also be obtained or derived from an existing application executed by the customer or other entity. In addition, the application may be executed using computing resources of the computing resource service provider, customer (e.g., an on-premises data center), or other entity.

Once the provisioning service has obtained customer application information, the provisioning service may then obtain resource requirements for the customer's application 604. As illustrated above in FIGS. 2 and 3, the customer may be prompted to provide an amount of computing capacity desired and/or required to execute the customer's application. The capacity may be provided in terms of compute units, number of computing resources (e.g., number of computing instances), physical resources (e.g., processors, memory, storage), or any other physical, logical, or other representation of an amount of computing resources required to execute the customer application.

The provisioning service may then obtain additional parameters for the customer's application 606. The additional parameters may include various parameters that modify the execution and/or placement of the computing resources utilized in the computing resource configuration to execute the customer's application. The additional parameters may be suggested by the provisioning service and/or modified by the customer or other entity such as another service of the computing resource service provider. Once the provisioning service has the application information and/or any other additional information associated with the customer's application, the provisioning service may determine computing resource configurations for the customer's application 608. For example, the provisioning service determines the computing resource configurations based at least in part on the set of available computing resources and the application information and other information provided by the customer.

The provisioning service may then provide the customer with information associated with the computing resource configurations 610. The information associated with the computing resource configurations may include the numbers, types, computing life cycle, physical resources, virtual resources, cost, price curve, fluctuation, interruption probability, or any other information associated with the computing resources included in the computing resource configuration that may aid the customer in making a determination of which computing resource configuration to select. This information may be displayed in a management console to the customer as described above.

Through the management console or other mechanism, the provisioning service may obtain customer selection of a computing resource configuration 612. For example, as described above, the customer may, through a user interface element, select a particular computing resource configuration from a set of computing resource configurations displayed to the customer. Once the provisioning service has obtained the customer's selection, the provisioning service may cause the computing resources defined in the computing resource configuration to be provisioned 614. As described above, the provisioning service or other service of the computing resource service provider may provision computing resources such as instance, storage nodes, auto scaling groups, load balancers, or other computing resources indicated in the computing resource configuration.

In numerous variations to the process 600, the resource requirements, additional parameters, and other information used to generate the computing resource configurations may be determined by one or more heuristics maintained by the provisioning service. For example as described above, once the customer has selected a type or category of the customer's application, the provisioning service may utilize one or more heuristics to suggest the resource requirements and/or additional parameters for execution of the customer application. The resource requirements and/or additional parameters suggested by the provisioning service may be modified by the customer. For example, if the customer indicates to the provisioning service that the customer application is a web site, the provisioning service may suggest that the zone parameter be set to diversified (e.g., distributing commuting resources between the maximum number of zones) and the computing life cycle parameter be set to maintain capacity. The customer may at some point in time later modify the suggested parameters.

In yet other variations to the process 600, the provisioning service may determine the category and/or type of application or task the customer is attempting to execute based at least in part on the resource requirements, additional parameters, and other information provided by the customer. For example, if the customer provides computing requirements and indicates that the zone parameter is to be optimized by cost and the computing life cycle parameter is set for a particular interval of time, the provisioning service may determine that the customer is attempting to execute a batch job based at least in part on the information provided and may suggest and/or modify one or more aspects of the computing resource configurations.

Figure 7:
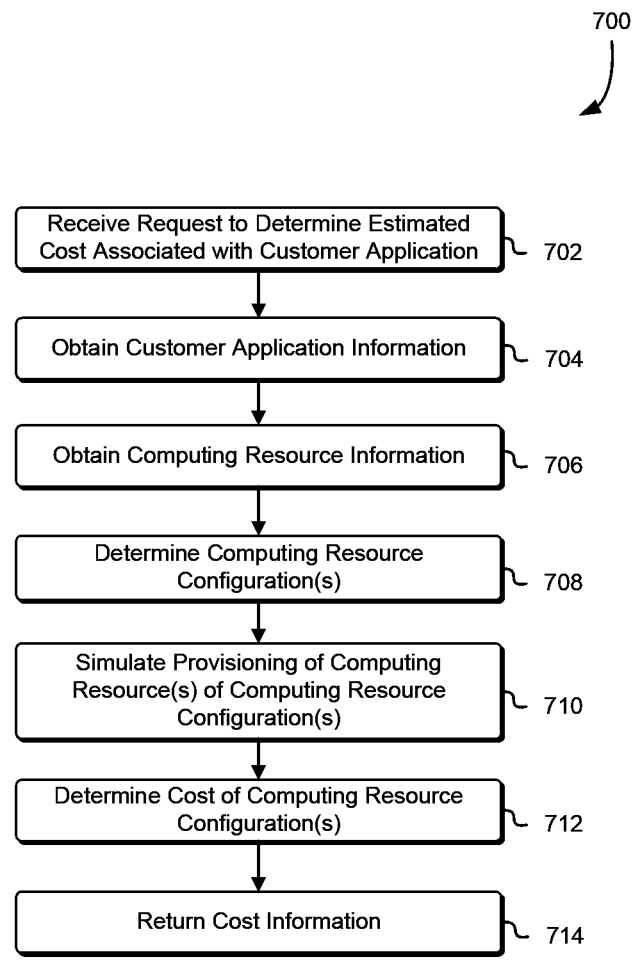
FIG. 7 is a block diagram that illustrates an example of determining information to enable a customer to select a computing resource configuration to provision and utilize to execute a customer application in accordance with an embodiment.

FIG. 7 is a block diagram illustrating an example of a process 700 for determining computing resource configurations and a cost associated with provisioning the computing resource configurations in accordance with an embodiment. The process 700 may be performed by any suitable system such as a provisioning service described above in connection with FIGS. 1 and 5. Some or all of the process 700 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

The process 700 includes receiving a request to determine an estimated cost associated with a customer's application 702. The request may be part of the process described in FIGS. 2-4 that guides the customer through the process of provisioning a set of computing resources to execute the customer application. For example, prior to selecting a particular computing resource configuration, the provisioning service may determine an estimated cost associated with the computing resource configurations generated by the provisioning service. The provisioning service, in response to the request, may obtain the customer application information 704. This information may be obtained directly from the customer or may have been previously received and stored by the provisioning service, for example, as a result of executing the process 600 described above in connection with FIG. 6.

The provisioning service may then obtain computing resource information 706. The computing resource information may include information associated with all of the computing resources available to execute the customer application. This may include computing resources of the computing resource service provider or another entity and may also include computing resources currently executing other tasks or applications. The computing resource information may be obtained from a service of the computing resource service provider as described above. The computing resource information may be obtained on demand (e.g., per request) or may be obtained periodically or a periodically and stored in a data store accessible to the provisioning service.

Based at least in part on the computing resource information, the provisioning service may determine a set of computing resource configurations 708. The set of computing resource configurations may include computing resources suitable for executing the customer application selected from the computing resource information. Furthermore, the computing resources included in the set of computing resource configurations may be selected based at least in part on the computing resources satisfying the requirements of the customer's application. The provisioning service may then simulate provisioning of the computing resources included in the set of computing resource configurations 710. For example, the provisioning service may simulate the impact (e.g., cost of instances or capacity of server computer systems) of provisioning each computing resource configuration of the set of computing resource configurations. The simulation may be performed a plurality of times and may include determining an amount of available computing resources in one or more logical or physical zones after provisioning of the computing resources included in a particular computing resource configuration.

The simulation may include determining a set of computing resources available in a particular availability zone, fault zone, power zone, data center, server computer system, service, or other logical or physical grouping of computing resources. The computer system executing the simulation may then execute the simulation by provisioning (e.g., removing the computing resource from the set of available computing resources) computing resources included in the computing resource configuration. For example, if the computing resource configuration includes 10 large instance types, the computer system executing the simulation may remove 10 large instances from the set of available computing resources associated with a particular zone or data center. Each logical or physical grouping of computing resources may be associated with a set of available computing resources (e.g., information about available or unused computing resources in the logical or physical grouping). In addition, a set of available computing resources may be distributed across logical or physical groupings. For example, a set of available computing resources used during a simulation may include available computing resources from a plurality of logical or physical groupings of computing resources.

The computing resources included in the various computing resource configurations may be removed from the set of available computing resources to generate a new set of available computing resources. The system executing the simulation may then determine additional information (e.g., cost, capacity, availability, or other information) based at least in part on the new set of available computing resources. Returning to the example above, the system executing the simulation may determine an amount of available computing resources and a cost associated with the amount of available computing resources once the 10 later instances have been removed from the set of available computing resources. As described above, this may include using a cost curve to determine a cost of each available instance based at least in part on the amount of available computing resources. Furthermore, the simulation may be performed a number of times and the results may be statistically combined to improve accuracy and reliability.

The provisioning service may then determine a cost associated with each computing resource included in the set of computing resource configurations 712. For example, the provisioning service may maintain a cost curve or other pricing index indicating the cost of computing resources based at least in part on an availability of the same type or category of computing resources in the same or different logical or physical zone. The cost curve or other pricing index may indicate that as an amount of computing resources declines in a particular logical or physical zone, the cost of utilizing the computing resources increases. The provisioning service may then return the cost information 714. Returning the cost information may include causing the cost information to be displayed in a user interface element displayed to the customer in a management console as described above in connection with FIG. 4.

Figure 8:
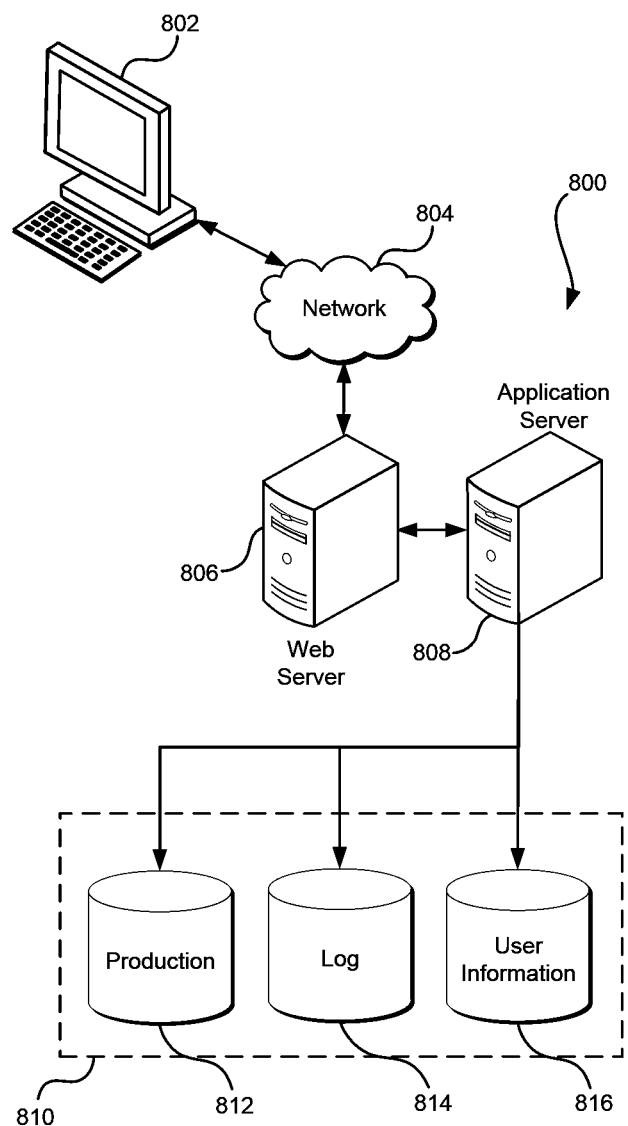
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a customer of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the customer, which may be served to the customer by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the customer audibly, visually, and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes, and/or other data storage mechanisms and media for storing data relating to a particular aspect of the present disclosure. For example, the data store illustrated may include mechanisms for storing production data 812 and customer information 816, which can be used to serve content for the production side. The data store also is shown to include a mechanism for storing log data 814, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update, or otherwise process data in response thereto. The application server 808 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a customer, through a device operated by the customer, might submit a search request for a certain type of item. In this case, the data store might access the customer information to verify the identity of the customer and can access the catalog detail information to obtain information about items of that type. The information then can be returned to the customer, such as in a results listing on a web page that the customer is able to view via a browser on the customer device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more customer computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from customer devices, such as by executing one or more web applications that may be implemented as one or more scripts or programs written in any programming language, such as Java®, C, C #, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
obtaining an application type specified by interaction with a user interface;
providing a pre-populated set of application parameters for display and modification in the user interface;
receiving, based at least in part on the pre-populated set of application parameters, information resulting from interaction with the user interface, wherein the information includes a set of constraints associated with an application to be performed on behalf of a user;
determining a set of computing resource configurations based at least in part on the set of constraints associated with the application, wherein each member of the set of computing resource configurations indicates a set of compute instances to execute the application;
performing a simulation for each computing resource configuration in the set of computing resource configurations to obtain a measurement of provisioning each computing resource configuration, thereby resulting in a set of measurements for the application;
providing the set of measurements in the user interface to enable selection of a configuration of the set of computing resource configurations;
receiving a selected configuration from the set of computing resource configurations;
provisioning a subset of the set of compute instances according to the selected configuration; and
causing the subset of the set of compute instances to execute the application.

2. The computer-implemented method of claim 1, wherein the application type further includes: a web application, batch job, or map reduce application.

3. The computer-implemented method of claim 1, wherein providing the pre-populated set of application parameters for display and modification in the user interface is based at least in part on applying one or more heuristics to the application type.

4. The computer-implemented method of claim 1, wherein the measurement further comprises an estimated cost of operating at least one computing resource configuration.

5. A system, comprising:
one or more processors; and
memory including executable instructions that, as a result of being executed by the one or more processors, causes the system to:
obtain information specifying a category of an application that is to be performed on behalf of a user through a user interface, the category of the application includes a set of constraints associated with the application;
determine a set of computing resource configurations based at least in part on the category in accordance with the set of constraints, each member of the set of computing resource configurations including information indicating a set of compute instances to execute the application;
receive a selection of a particular computing resource configuration of the set of computing resources configurations through the user interface;
provision at least one compute instance of the set of compute instances indicated in the particular computing resource configuration; and
cause the at least one compute instance to execute the application.

6. The system of claim 5, wherein the memory further includes executable instructions that, as a result of being executed by the one or more processors, cause the system to simulate provisioning compute instances included in the set of computing resource configurations by at least determining a cost based at least in part on an amount of available compute instances.

7. The system of claim 5, wherein the executable instructions that cause the system to obtain information specifying the category of the application further includes executable instructions that, as a result of being executed by the one or more processors, cause the system to select one or more parameters for determining the set of computing resource configurations based at least in part on one or more heuristics.

8. The system of claim 5, wherein the memory further includes executable instructions that, as a result of being executed by the one or more processors, cause the system to:
receive a cost cap associated with executing the application; and
determine the set of computing resource configurations based at least in part on the cost cap.

9. The system of claim 8, wherein the memory further includes executable instructions that, as a result of being executed by the one or more processors, cause the system to determine an interruption probability based at least in part on the cost cap, the interruption probability indicating a probability of interruption of execution of the application as a result of a cost of compute instances exceeding the cost cap.

10. The system of claim 5, wherein the memory further includes executable instructions that, as a result of being executed by the one or more processors, cause the system to receive a capacity requirement associated with executing the application through the user interface.

11. The system of claim 10, wherein the capacity requirement includes a number of processors required of the set of compute instances.

12. The system of claim 10, wherein the capacity requirement includes an amount of network bandwidth required of the set of compute instances.

13. A non-transitory computer-readable storage medium comprising executable instructions that, as a result of being executed by one or more processors of a computer system, cause the computer system to at least:
obtain information indicating a type of an application, wherein the type of the application includes a set of constraints for the application that is to be performed on behalf of a user;

determine a set of compute instances suitable to execute the application based at least in part on the information, the set of compute instances satisfying the type of the application indicated in the information;

determine a subset of the set of compute instances that have been selected to execute the application based at least in part on the information indicating the type of the application in accordance with the set of constraints for the application; and cause the subset of the set of compute instances to execute the application.

14. The non-transitory computer-readable storage medium of claim 13, wherein the instructions further comprise instructions that, as a result of being executed by the one or more processors, cause the computer system to determine the set of compute instances further include instructions that cause the computer system to determine at least one storage instance satisfying one or more conditions to include in the set of compute instances.

15. The non-transitory computer-readable storage medium of claim 13, wherein the instructions further comprise instructions that, as a result of being executed by the one or more processors, cause the computer system to obtain information indicating the type of an application further includes instructions that cause the computer system to obtain information of the type of the application for an executing instance of a second application.

16. The non-transitory computer-readable storage medium of claim 13, wherein the instructions further comprise instructions that, as a result of being executed by the one or more processors, cause the computer system to determine the set of compute instances further includes instructions that cause the computer system to determine a load balancer to include in the set of compute instances, the load balancer responsible to directing requests to the set of compute instances.

17. The non-transitory computer-readable storage medium of claim 13, wherein the instructions further comprise instructions that, as a result of being executed by the one or more processors, cause the computer system to determine an estimated cost and an estimated capacity associated with the set of compute instances based at least in part on a number of simulations of provisioning the set of compute instances.

18. The non-transitory computer-readable storage medium of claim 17, wherein the instructions that cause the computer system to determine the estimated cost associated with the set of compute instances further include instructions that cause the computer system to determine the estimated cost based at least in part on one or more pricing curves associated with the set of compute instances.

19. The non-transitory computer-readable storage medium of claim 13, wherein the instructions further comprise instructions that, as a result of being executed by the one or more processors, cause the computer system to transmit a request to an automation service to provision the set of the compute instances.

20. The non-transitory computer-readable storage medium of claim 13, wherein the instructions further comprise instructions that, as a result of being executed by the one or more processors, cause the computer system to:

determine a second subset of compute instances of the set of compute instances that satisfies the type of an application as a result of at least one compute instance of the set of compute instances no longer satisfying the type of an application; and cause the second subset of the compute instances to execute the application.

* * * * *